Sept. 3, 1963    M. D. ELLEDGE    3,102,445
LATHE TOOL HOLDING AND OPERATING ATTACHMENT
Filed July 16, 1959    2 Sheets-Sheet 1
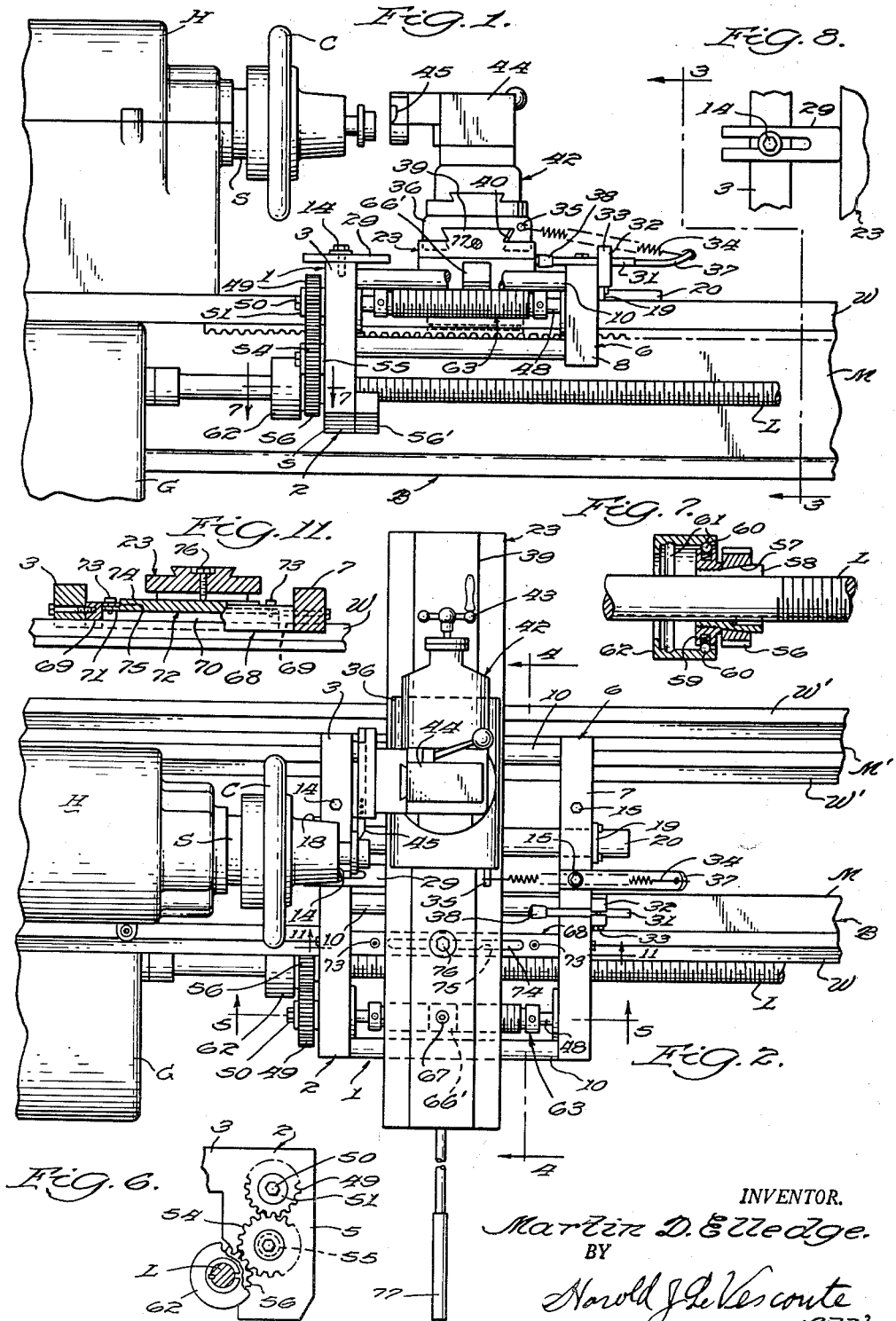
INVENTOR.
Martin D. Elledge.
BY
Harold J. LeVesconte
Atty.

Sept. 3, 1963 M. D. ELLEDGE 3,102,445
LATHE TOOL HOLDING AND OPERATING ATTACHMENT
Filed July 16, 1959 2 Sheets-Sheet 2
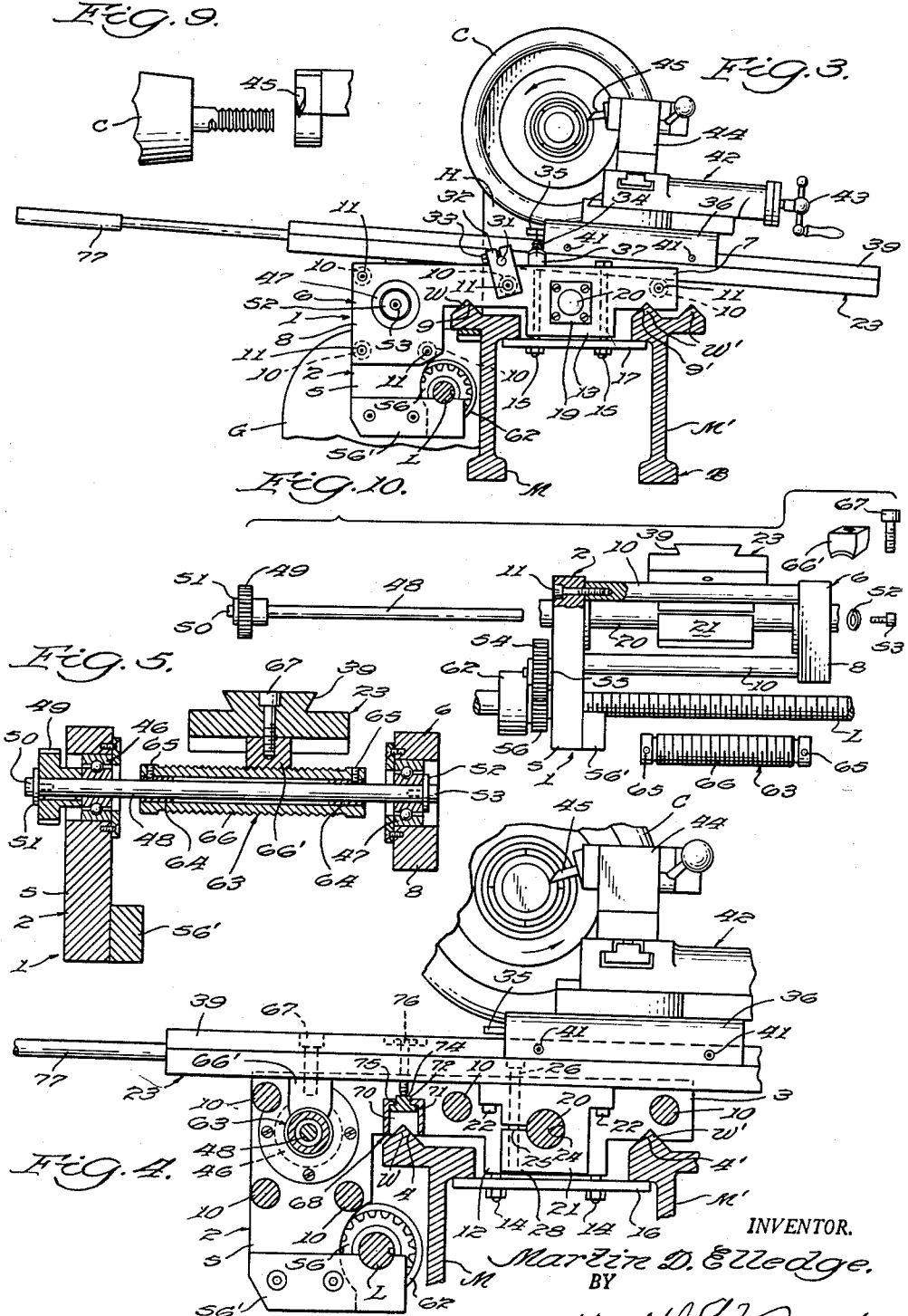
INVENTOR.
Martin D. Elledge.
BY
Harold J. LeVesconte
ATTY.

3,102,445
**LATHE TOOL HOLDING AND OPERATING
ATTACHMENT**
Martin D. Elledge, Monrovia, Calif.
Filed July 16, 1959, Ser. No. 827,570
8 Claims. (Cl. 82—5)

This invention is directed to lathes and more particularly to a tool holding and operating attachment especially adapted to convert a lathe into a machine for precision, repetitive operations such as thread cutting or precision turning and facing operations.

The principal object of the invention is to provide a tool holding and operating means adapted for detachable mounting on a lathe bed and which means, through connections with the lathe feed mechanism actuates a tool carried by said means in synchronous relation with the rotation of the lather spindle whereby the tool point is at all times in the proper relation for successive cuts as in cutting a thread.

Another object of the invention is to provide a lathe tool holding and operating attachment mountable on the the bed of a lathe and including connections with the lathe lead screw effectively when engaged to positively move the tool in one direction only longitudinally of the lathe bed and in which there is provided means other than the leadscrew constantly yieldingly operative to urge movement of the tool in the opposite direction.

A further object of the invention is to provide a lathe tool holding and operating attachment mountable upon the lathe bed in which movement of the tool carrying means into engagement with a feeding means to move the tool longitudinally of the lathe bed automatically moves the tool into cutting relation to the workpiece and in which disengagement of the feeding means automatically disengages the tool from cutting relation with the workpiece.

With the foregoing objects in view together with such additional objects and advantages as may subsequently appear, the invention resides in the parts, and in the construction, combination, and arrangement of parts described, by way of example, in the following specification of a presently preferred embodiment of the invention, reference being had to the accompanying drawings which form a part of said specification and in which drawings:

FIG. 1 is a front elevation of a lathe attachment embodying the present invention shown as mounted on a lathe bed with the tool held thereby disengaged from a workpiece in the lathe spindle and the tool holding means disengaged from the means which provides the feeding movement of the tool along the face of the work, FIG. 2 is a top plan elevation of the device shown in FIG. 1, the tool being shown at the position occupied at the completion of a cut on the workpiece, FIG. 3 is an end elevational view of the device, the view being taken on the line 3, 3 extending through the lathe bed; the tool being shown disengaged from a workpiece, FIG. 4 is an enlarged scale sectional view taken on the line 4, 4 of FIG. 2 and generally similar to FIG. 3 except that the tool is shown in engagement with the work, FIG. 5 is a fragmentary sectional view taken on the line 5, 5 of FIG. 2 and particularly showing the structure of the tool feeding mechanism.

FIG. 6 is a side elevational view of the gearing comprising the driving connection with the leadscrew of the lathe, the view being taken, for example, on the line 6, 6 of FIG. 1, a portion of the shield for the leadscrew gear being broken away for clearness of illustration, FIG. 7 is a fragmentary sectional view on the line 7, 7 of FIG. 1 and particularly showing the structure of the shield for the gear on the leadscrew of the lathe, FIG. 8 is a top plan view of the adjustable stop for limiting the extent of movement of the tool carrier toward the lathe spindle, FIG. 9 is a top plan view of a workpiece and a threading tool used in conjunction therewith showing a relation of the threading tool to the workpiece, FIG. 10 is an exploded view of the component parts of the tool carrier feed mechanism illustrating the means by which different rates of speed are attained, and FIG. 11 is a fragmentary sectional view on the line 11—11 of FIG. 2.

Referring to the drawings, the illustrated embodiment of the invention is shown applied to a lathe having a bed structure B including parallel front and rear members M and M' having ways W and W' on the upper faces thereof on which a carriage (not shown) normally is supported and guided in its traverse of the bed, a headstock H in which a spindle S is journaled, said spindle having a workpiece carrying means exemplified by the chuck C and a leadscrew L extending along the front face of the member M and driven by changed speed gearing (not shown) contained in a gear box G in which one end of the leadscrew is journaled.

The frame 1 of the device includes a first end member 2 at the end thereof adjacent the headstock, said member including a horizontal portion 3 lying upon the lathe carriage ways W and W' and notched as at 4 and 4' to fit the ways and further having a depending portion 5 at the front of the lathe bed and which in part carries a gear train to which detailed reference will later be made. The frame 1 further includes a second end member 6 extending parallel to and spaced from the member 2 and having a horizontal portion 7 generally similar to the horizontal portion 3 and a depending portion 8 at the front end thereof which is somewhat shorter than the depending portion 5 of the member 2; the longitudinal portion being provided with notches 9 and 9' engaging the ways W and W'. The members 2 and 6 are maintained in spaced parallel relation by a series of spacer bars 10 which abut the adjacent faces of the members and are secured thereto by screws 11 threaded into the ends of the bars and having the heads thereof seated in counterbores in the outer faces of the frame members. Alternatively, if desired, this frame structure may be of unitary construction as by casting it or by uniting the component parts by welding or brazing.

The horizontal portions 3 and 7 of the members 2 and 6 are provided, respectively, with identical depending lug portions 12 and 13 disposed between the members M and M' and terminating slightly above the lateral ledges at the upper ends of the frame members and bolts 14, 14 and 15, 15, respectively, secure bars 16 and 17 against the under faces of these ledges and thus clamp the frame structure to the lathe bed at a desired distance from the chuck or other workpiece holding means on the spindle, it being understood that when this device is used on the lathe the normal carriage of the lathe is either run along the ways toward the tail stock sufficiently to give clearance room for the device or, if that does not provide sufficient room, is removed entirely from the lathe.

The lug portions 12 and 13 are provided with, respectively, aligned bearings 18 and 19 in which a bar 20 is journaled for both rocking movement and for endwise movement in a direction parallel to the axis of the spindle, the axis of said bar being below the spindle and slightly in rear of a vertical plane containing the axis of the spindle. Mounted on the bar 20 between the bearings 18 and 19 is a supporting block 21 to the upper face of which screws 22 secure a carriage 23 extending transversely of the bar 20. The bore 24 in the block 21 through which the bar 20 extends is provided with a slot 25 at one side thereof and a bolt 26 extending through the carriage 23 and a portion of the block 20 above the slot 25 and threaded into the portion 28 below the slot provides means whereby the block and carriage, as a unit, may be clamped to the bar 20. The block 21 being of less width than the space between the members 2 and 6, allows endwise movement of the bar through the bearings 18 and 19 and acts as a stop to limit the maximum extent of such movement. Additionally, adjustable stop means for further limiting the extent of reciprocatory movement of the bar 20 and the portions of the device carried thereby is provided. The adjustable means for limiting the extent of movement toward the headstock and spindle comprises a slotted bar 29 which is clamped to the top surface of the horizontal portions 3 of the member 2 in any desired position thereon by one of the bolts 14 and is positioned to be engaged by the side of the carriage 23. The adjustable means for limiting movement in the opposite direction comprises a rod 31 clamped in a block 32 by a clamp screw 33; the block 32 being secured to the side of the member 6 by one of the screws 11 which secures the member 6 to one of the spacer bars 10.

As will be later explained, the bar 20 and the devices carried thereby are given a positive feeding motion toward the end of the spindle and upon reaching a predetermined point, the feeding motion is released. A tension spring 34 extends between a stud 35 on a saddle 36 mounted on the carriage 23 and a bracket 37 secured to the top of the frame member 6 by one of the bolts 15 and constantly yieldingly urges the bar 20 and the devices carried thereby away from the headstock. For this reason, the end of the rod 31 is provided with a rubber tip 38 to cushion the shock of the engagement of the side of the carriage base member with the rod 31.

The top surface of the carriage 23 is formed as a dovetailed slide 39 extending transversely to the bar 20 and a saddle 36 is correspondingly dovetailed for sliding engagement therewith. A gib 40 is inserted between the adjacent side faces of the dovetail at the side remote from the headstock and a pair of screws 41, 41 extending through the sidewall of the saddle and engaging the gib provides means whereby the saddle may be secured at a desired position along the dovetail slide 39.

Fixed to the saddle 36 is a compound tool rest 42 adjustable by a leadscrew attached to the crank handle 43. The tool rest carries a tool post 44 in which a cutting tool 45 is mounted, the type of cutting tool being, of course, one which is suitable for the operation to be performed. The direction of rotation of the spindle is counter-clockwise as viewed in FIGS. 3 and 4 and the tool 45 is disposed at the rear of the work. The under side of the carriage is slightly above the surfaces of the spacer bars 10 which are at the front and rear ends of the members 2 and 6 and therefore has a slight rocking movement with the bar 20 in its bearings in said members. Since the axis of the bar 20 is below the axial line of the spindle, the rocking of the carriage base member tends, among other things, to move the tool point toward and away from the surface of the work. It will be noted that the tool rest structure is in rear of the axis of the bar 20 and therefore the weight of this tool rest together with the force exerted by the contact of the tool with the work is one which will tend to rock the entire portion of the device carried by the bar 20 in a clockwise direction about the axis of the bar 20 as viewed in FIGS. 3 and 4 and thus away from the work.

Mounted in ball bearings 46 and 47 carried, respectively, by the forward ends of the frame members 2 and 6 is a shaft 48 which outside of the outer face of the member 2 carries a gear 49 fixed thereto. The hub of the gear 49 engages the outer face of the inner race of the ball bearing 46 and a screw 50 and washer 51 hold the gear on the shaft. A washer 52 and screw 53 at the opposite ends of the shaft engage the inner race of the bearing 47 to cooperate with the screw and washer at the other end to hold the shaft against endwise movement in the bearings. The gear 49 meshes with an idler gear 54 carried by a stub shaft 55 on the outer face of the vertical depending portion 5 of the end member 2 and this idler gear, in turn, meshes with a driving gear 56 mounted on the leadscrew shaft L of the lathe adjacent the gear box G thereof. As shown in FIG. 7, this driving gear can conveniently be secured to the leadscrew shaft by giving it a tapered bore 57 engaging the exterior of a tapered split collet 58 which is keyed to the shaft L and which carries a nut 59 engaging threads thereon whereby the nut is operable to force the gear toward the larger end of the collet to clamp it against rotation thereon. Additionally, the nut 59 may be provided with one or more spring detents 60 engageable with spaced circular internal grooves 61 in a cap member 62 which is movable to a position over the driving gear 56 when it is not in use or clear of the gear when the device is installed on the lathe bed. The opposite face of the depending portion 5 may be provided with a rest 56' to support the leadscrew L.

Secured on the shaft 48 between the bearings 46 and 47 is a feed screw member 63 which is preferably of considerably larger diameter than the shaft 48 and is provided with bushings 64, 64 at the opposite ends thereof, said feed screw member being detachably secured on the shaft 48 by set screws 65, 65 extending through the ends of the member and the bushings. Between the ends of the member it is provided with an external threaded portion 66 which is engaged by a correspondingly threaded nut section 66' secured to the under face of the carriage 23 by a screw 67 when said carriage is rocked about the axis of the bar 20 to bring the tool into cutting relation with a workpiece held in the chuck or other holding means on the spindle. When the carriage 23 is rocked in the opposite direction as far as permitted by the engagement of the under side of said member with the rearmost of the spacer bars 10 as shown in FIG. 3, the nut section 66' is raised clear of engagement with the feed screw member 63 as shown in FIG. 1 and the spring 34 then returns the carriage bar 20 to its starting position.

The frame structure carries a transverse member 68 extending between the horizontal portions 3 and 7 of the end members 2 and 6 and disposed directly above the front way W; said member at its opposite ends being provided with longitudinally extending grooves 69, 69 engaging the way W and between said ends being hollowed out from the under side thereof to provide a mounting space 70 for the flange 71 of a wear plate member secured therein by screws 73, 73. The wear plate member 72 has a wear or slide surface 74 which projects through a slot 75 in the top surface of the member 68. The carriage 23 carries a screw 76 threaded therein and having a hardened lower end engageable with the wear or slide surface 75; said engagement being so adjusted by rotation of the screw 76 that the nut portion 66' is fully seated in the feed screw member without applying an appreciable radial load thereon. The forward end of the carriage 23 carries a forwardly extending handle 77 by which it may be rocked downwardly into operating position as will be described in connection with the operation of the device.

Assuming that the device has been installed on a lathe substantially as shown in the drawings and that all of the preliminary adjustments have been made with reference to a workpiece P held in the chuck of the machine, the machine is started and the spindle S and leadscrew L are rotating at a desired speed. At this time, the weight of the saddle and tool rest carried on the carriage 23 normally hold the carriage rocked about the axis of the bar 20 to the position shown in FIG. 3. In this position, the nut 66' is out of engagement with the feed screw member 63 and therefore the spring 34 will have pulled the carriage base member and the parts associated therewith to the right and into engagement with the stop member 31 as shown in FIG. 1. At such time as shown in FIG. 1, the tool 45 is beyond the outer end of the workpiece. Upon rocking the carriage counter in a clockwise direction by use of the handle 77 as far as permitted by the engagement of the screw 76 with the wear plate member 72, the tool will be in position to form a cut and the rotating feed screw will cause the carriage and the parts carried thereby to move to the left until the carriage engages the stop 29. At that time the engagement of the nut 66' with the threads 66 of the feed screw will force the carriage to rock in a clockwise direction about the bar 20, removing the tool from cutting relation with the work and allowing the spring 34 to pull the carriage to the right and into engagement with the stop 31. The tool is then fed inwardly by the crank 43 to the desired extent and the handle 77 pressed down again for the next cut. By this means a relatively unskilled operator can perform turning or thread cuttings operations up to a shoulder or other transverse surface with great accuracy. When another workpiece is placed in the chuck, the tool is, of course, backed off for the beginning of the first cut.

Referring next to FIG. 9 it is shown that this same set of parts can be used for cutting a thread on a workpiece P'. The gear box is set (for example) so that the leadscrew L makes one revolution for each revolution of the spindle and the threads 66 on the feed screw are the same as the threads to be cut. Alternatively, the speed of the leadscrew can be some aliquot part or multiple of the rotation of the spindle and the threads on the feed screw members 66 can be proportioned accordingly. In any event, the arrangement of the device is such that in cutting a thread the tool will always enter the workpiece at the same point and terminate at the same point so that by merely feeding the tool inwardly toward the work between successive cuts to the desired depth, the chasing of a thread by a series of successive cuts becomes an operation that can be performed by a relatively unskilled operator.

From the foregoing it will be appreciated that, by the use of this device, an ordinary engine lathe can be converted either permanently or temporarily into a highly efficient production device for operation capable of being performed by relatively unskilled operators which otherwise would require a highly skilled machinist. When the device is not needed for its particular function, it can be readily removed from the lathe and the lathe restored to its normal use.

While in the foregoing specification there has been described a presently preferred embodiment of the invention, the invention is not to be deemed to be limited to the exact construction thus disclosed by way of example and it will be understood that the invention includes as well, all such changes and modifications in the parts, and in the construction, combination and arrangement of parts as shall come within the purview of the appended claims.

I claim:

1. An attachment for adapting a lathe of the type having a headstock, horizontal carriage supporting ways and a leadscrew for repetitive operations; said attachment comprising a frame structure adapted to be detachably supported on the ways of a lathe bed, means for clamping said frame structure in a desired fixed position along the ways, a tool rest, a supporting carriage on which said tool rest is mounted, means for mounting said carriage on said frame structure for limited rocking action about an axis disposed below and parallel to the lathe spindle axis with resultant movement of a tool carried by said tool rest and disposed substantially horizontally opposite the spindle axis toward and away from the surface of a workpiece carried by the spindle; said mounting means for said carriage also affording clearance for reciprocatory movement of said carriage and the tool rest carried thereby in a path parallel to the axial line of said rocking movement with resultant movement of the tool longitudinally of the axis of rotation of the workpiece, means limiting the extent of rocking movement of said carriage, means adjustably limiting the extent of said reciprocatory movement of said carriage toward the lathe headstock, other means adjustably limiting the extent of said reciprocatory movement in the opposite direction, power actuated means carried by said frame structure and operatively connected to the lathe leadscrew at a point adjacent to the point on the lathe bed ways on which said frame structure is mounted, manually engageable, normally disengaged means for causing said power means to move said carriage toward the lathe headstock, and resilient means opposing the action of said power actuated means and effective, upon disengagement of the power actuated means to move said carriage away from the lathe headstock to the extent permitted by said other means for limiting movement of said carriage.

2. An attachment for adapting a lathe of the type having a headstock, horizontal carriage supporting ways and a lead screw for repetitive operations; said attachment comprising a frame structure adapted to be detachably supported on the ways of a lathe bed, means for clamping said frame structure in a desired fixed position along the ways, a tool rest, a supporting carriage on which said tool rest is mounted, means for mounting said carriage on said frame structure for limited, rocking action about an axis disposed below and parallel to the lathe spindle axis with resultant movement of a tool carried by said tool rest and disposed substantially horizontally opposite the spindle axis toward and away from the surface of a work piece carried by the spindle; said mounting means for said carriage also affording clearance for reciprocatory movement of said carriage and the tool rest carried thereby in a path parallel to the axial line of said rocking movement with resultant movement of the tool longitudinally of the axis of rotation of the workpiece, means limiting the extent of rocking movement of said carriage, means limiting the extent of said reciprocatory movement of said carriage toward the lathe headstock, other means limiting the extent of said reciprocatory movement in the opposite direction, normally disengaged, manually controlled, power actuated means for effecting said reciprocatory movement toward the lathe headstock including a feed screw carried by said frame structure, a nut element complementary to said feed screw connected to said carriage and normally disengaged from said feed screw, manually operable means for effecting engagement of said nut and feed screw simultaneously with movement of said tool toward the spindle axis, and rotatable means on said frame operatively connected to the lathe leadscrew at a point on the leadscrew adjacent the point on the lathe bed ways on which said frame structure is mounted for rotating said feed screw in a predetermined ratio to the rate of rotation of the lathe spindle.

3. An attachment for adapting a lathe of the type having a headstock, horizontal carriage supporting ways and a lead screw for repetitive operations; said attachment comprising a frame structure adapted to be detachably supported on the ways of a lathe bed, means for clamping said frame structure in a desired fixed position along the ways, a supporting carriage having a tool rest supporting surface extending transversely of and disposed above the lathe bed, a tool rest mounted on said carriage and adapted to position a tool carried thereby substantially in a horizontal plane containing the lathe spindle axis and in rear of a workpiece carried by the spindle, means for mounting said carriage on said frame structure for limited rocking action about an axis disposed below and parallel to the lathe spindle axis with resultant movement of a tool carried by a tool rest toward and away from the surface of the workpiece; said mounting means for said carriage also affording clearance for reciprocatory movement of said carriage and the tool rest carried thereby in a path parallel to the axial line of said rocking movement and with resultant movement of the tool longitudinally of the axis of rotation of the workpiece, means limiting the extent of rocking and reciprocatory movement of said carriage, normally disengaged, manually engaged power actuated means for effecting said reciprocatory movement in one direction including a feed screw carried by said frame structure, a nut element complementary to said feed screw connected to said carriage and normally disengaged from said feed screw, manually operable means for effecting engagement of said nut and feed screw and rotatable means on said frame operatively connected to the lathe leadscrew at a point on the leadscrew adjacent to the point on the lathe bed ways on which said frame structure is mounted for rotating said feed screw in a predetermined ratio to the rate of rotation of the lathe spindle.

4. An attachment for adapting a lathe of the type having a headstock, horizontal carriage supporting ways and a lead screw for repetitive operations; said attachment comprising a frame structure adapted to be detachably supported on the ways of a lathe bed, means for clamping said frame structure in a desired fixed position along the ways, a tool rest, a supporting carriage on which said tool rest is mounted, a cylindrical bar mounted in said frame structure for both rocking movement about and endwise movement along an axial line parallel to and below the axial line of the lathe spindle, means for mounting said carriage fixedly on said bar for movement therewith, means engageable with said carriage effective to limit the extents of said movements by said carriage and bar, normally disengaged manually engageable, power actuated means carried by said frame structure and connected to the lathe leadscrew at a point thereon adjacent to the point on the lathe bed ways on which said frame structure is mounted, devices carried by said carriage manually operable to engage said power actuated means for causing movement of said bar and said carriage in one direction along the axial line of said bar and other means connected to said carriage yieldingly opposing movement thereof deriving from engagement with said power actuated means and effective upon disengagement from said power actuated means to move said carriage and said bar in the direction opposite that caused by said power actuated means.

5. A lathe tool holding and operating means as claimed in claim 4 in which said power actuated means includes a feed screw means rotatably mounted on said frame, a gear co-axially connected to and rotatable with said feed screw means, and other power transmitting means on said frame connecting said gear with power transmitting means on the lathe leadscrew for rotation of said feed screw thereby.

6. Means for adapting a lathe of the type having a headstock including a spindle rotatable therein, horizontal, carriage supporting ways, and a leadscrew disposed in front of and extending parallel to the ways for repetitive operations; said means comprising an attachment including a frame structure adapted to rest upon the ways at any desired point therealong, said frame structure including spaced feed screw supporting members depending therefrom in front of the ways and at least one of said members extending laterally in front of the lathe leadscrew, a rotatable feed screw supporting means journaled in said members, a feed screw member carried by said feed screw supporting means and disposed between said members, rotatable, feed screw driving means attachable at any desired point along the lathe leadscrew and fixed thereto adjacent to one depending member, power transmitting means interposed between said feed screw driving means and said feed screw supporting means operative to transmit rotative movement of the lathe leadscrew to said feed screw supporting means, a tool rest, a tool rest supporting carriage having a portion thereof disposed above said feed screw, means mounting said carriage on said frame structure for limited rocking movement about an axial line below and parallel to the axial line of the lathe spindle and for limited reciprocatory movement parallel to said axial lines, a sectoral nut element carried by the under side of said carriage engageable and disengageable with said feed screw incident to said rocking movement, and a tool carried by said tool rest and having the cutting edge thereof disposed in rear of a workpiece rotated by the lathe spindle and substantially in a horizontal plane containing the axis of rotation of the workpiece, means for adjusting said tool rest and tool on said carriage in a line normal to said axis of rocking movement, and manually operable means for imparting said rocking movement to said carriage; rocking movement thereof in one direction effecting engagement of said nut with said feed screw and moving said tool toward said workpiece.

7. An attachment for lathes as claimed in claim 6 in which said feed screw supporting means comprises a shaft and in which said feed screw comprises a tubular element having threads on the outer surface thereof and having an axial bore closely fitting said shaft and further including means for clamping said feed screw to said shaft for rotation therewith whereby feed screws having threads of different pitches may be interchangeably mounted on said feed screw supporting means.

8. A lathe attachment as claimed in claim 6 in which said engagement of said nut with said feed screw effects movement of said carriage in one direction parallel to said axial lines and in which spring means is incorporated operative constantly to urge said carriage in the opposite direction.

References Cited in the file of this patent

UNITED STATES PATENTS

| | | |
|---|---|---|
| 1,548,576 | Batchel | Aug. 4, 1925 |
| 1,582,669 | Durkee | Apr. 27, 1926 |
| 1,761,243 | Townsend | June 3, 1930 |
| 2,248,692 | Adcock | July 8, 1941 |
| 2,381,849 | Varndell | Aug. 7, 1945 |
| 2,693,731 | Mobius | Nov. 9, 1954 |
| 3,797,601 | Renoux | July 2, 1957 |

FOREIGN PATENTS

| | | |
|---|---|---|
| 75,568 | Switzerland | Mar. 1, 1918 |
| 97,882 | Australia | Sept. 25, 1924 |